UNITED STATES PATENT OFFICE.

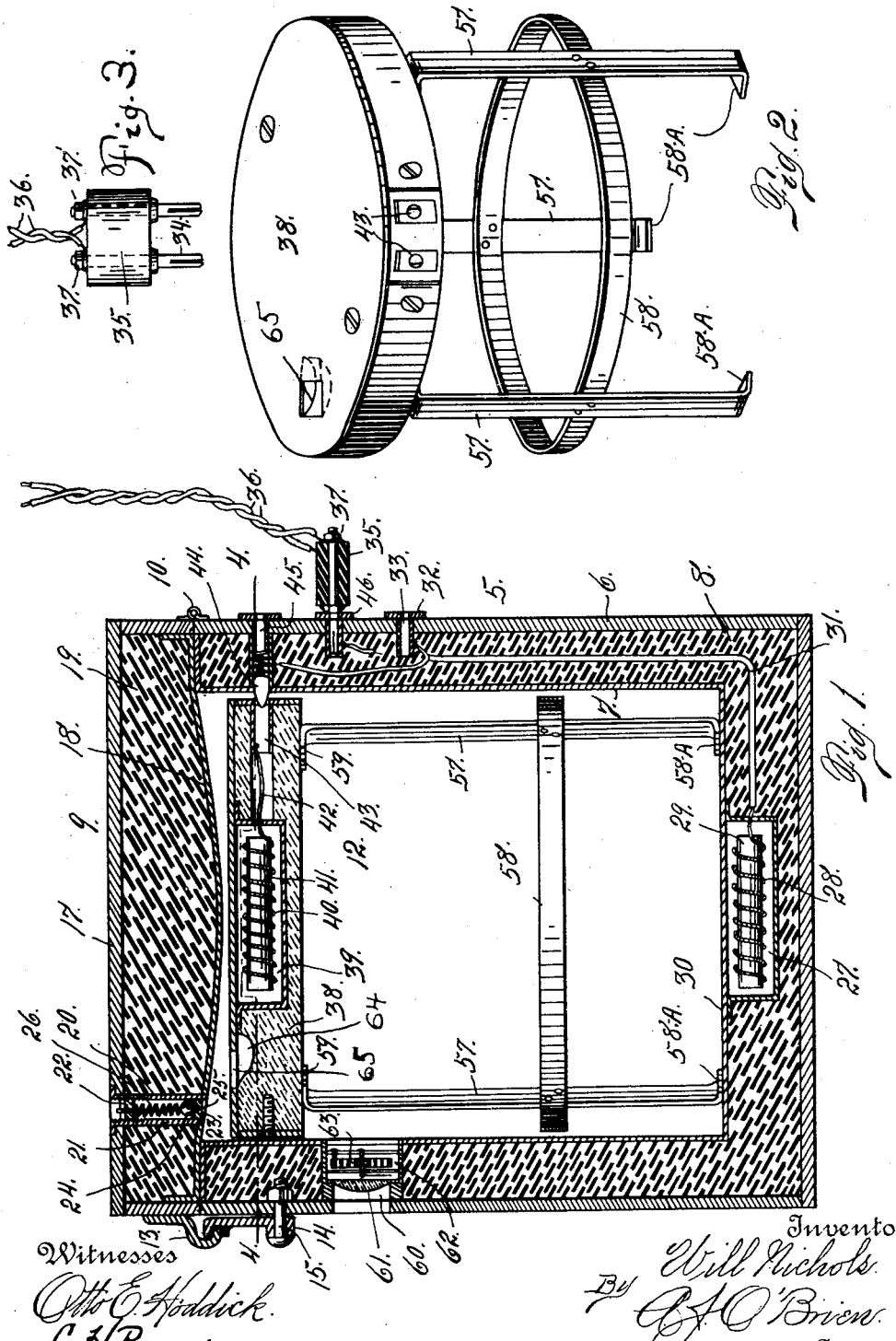

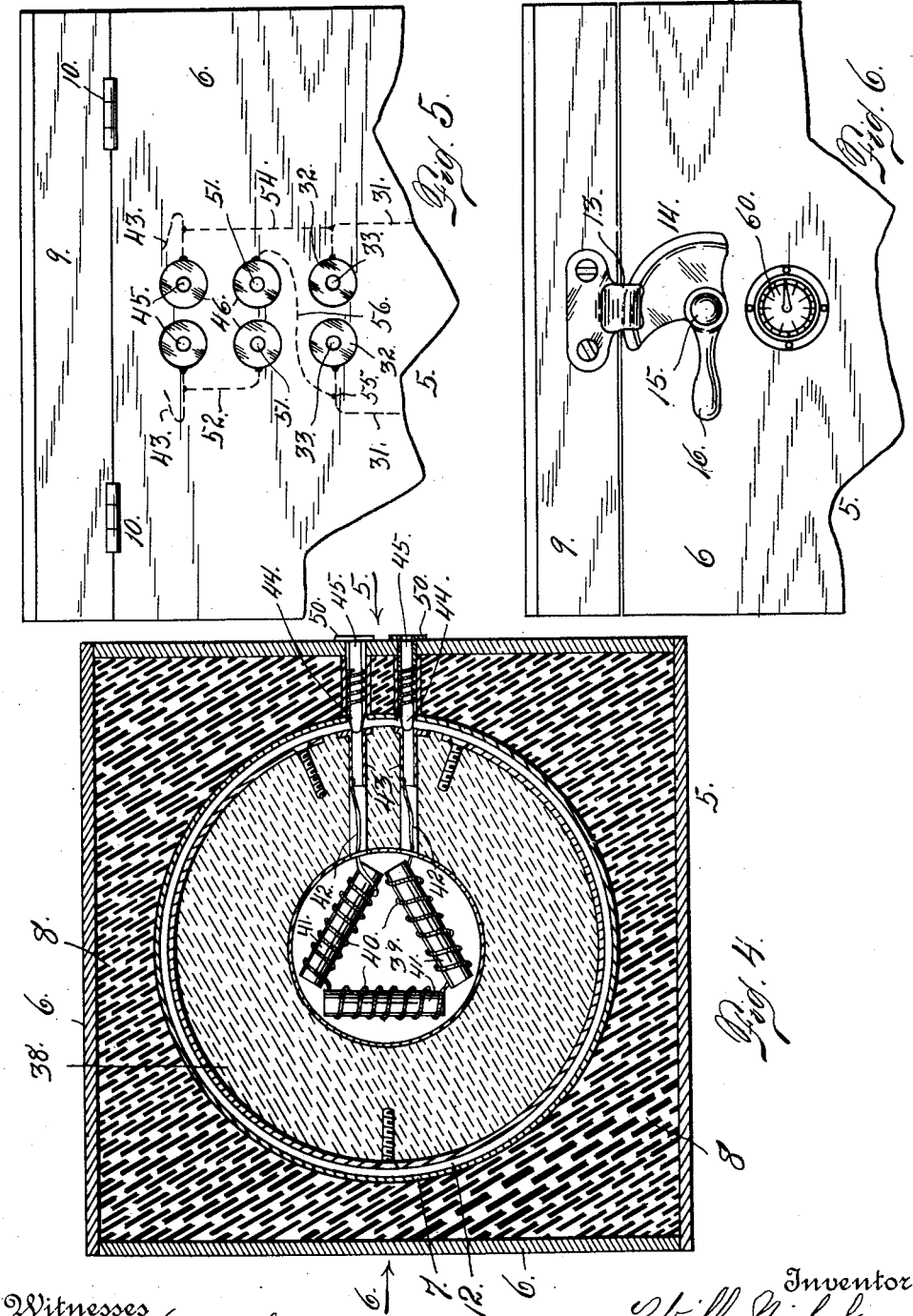

WILL NICHOLS, OF DENVER, COLORADO, ASSIGNOR OF ONE-HALF TO ADAM F. REXROAD, OF DENVER, COLORADO.

ELECTRIC COOKER.

997,467.  Specification of Letters Patent.  Patented July 11, 1911.

Application filed March 11, 1910. Serial No. 548,571.

*To all whom it may concern:*

Be it known that I, WILL NICHOLS, a citizen of the United States, residing in the city and county of Denver and State of Colorado, have invented certain new and useful Improvements in Electric Cookers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in electric cookers, my object being to provide a construction of this class in which the cooking, whether baking or other form of cooking may be advantageously and economically carried on by the use of electricity alone as the source of heat.

In my improved construction, I provide a sort of oven or receptacle having relatively thick walls whereby the escape of heat by radiation or conduction is obviated for all practical purposes. The filling or packing for the walls of the heater is preferably composed of mica ground or comminuted sufficiently for the purpose. Mica not only serves to resist the escape of heat by conduction, but also serves as an electrical insulator, which is an important feature in an electrical heater, since the electrical conductors must to a greater or less extent pass through the walls of the cooker. In my improved construction I employ coils of wire of sufficient electrical resistance for the purpose. One set of these coils is located in the bottom of the cooker while another set is located in a removable and reversible disk or plate supported in the upper part of the cooker by a skeleton frame which rests upon the bottom of the cooker. The upper set of coils is set into a recess formed in the disk which is preferably composed of fire clay and metal-bound around its edge for strengthening purposes. On one side of the fire clay disk the recess is open except for a metal plate covering which not only closes the recess where the coils are located but also extends over the surface of one side of the disk. When it is desired to use this disk for the purpose of cooking articles resting upon or applied to the metal plate surface of the disk, the last named surface is uppermost and when in this form various kinds of food may be cooked thereon, either directly, as pancakes, or by setting different utensils thereon. When, however, the oven is used for baking, it is preferred to reverse the position of the said disk, whereby its metal plate surface is lowermost, causing the heat to be radiated downwardly therefrom, as well as upwardly from the bottom, thus producing an equable heat throughout the oven or cooking chamber and causing the material, as bread, to be baked evenly throughout its entire thickness.

In my improved construction I have arranged the wiring for the two sets of coils so that by the employment of a single pair of removable electrodes, either coil may be placed in the electrical circuit, or both coils simultaneously, as may be desired.

Having briefly outlined my improved construction, I will proceed to describe the same in detail, reference being made to the accompanying drawing in which is illustrated an embodiment thereof.

In this drawing: Figure 1 is a vertical section taken through my improved cooker, showing the apparatus complete. Fig. 2 is a perspective view of the disk detached from the cooker and illustrating the manner of using it independently of the body of the cooker. Fig. 3 is a side elevation of an electrode shown in detail and adapted to be employed in connection with the cooker for closing the circuit through either or both sets of coils when the disk is employed within the oven or cooker chamber. Fig. 4 is a horizontal section taken through the cooker on the line 4—4, Fig. 1. Fig. 5 is a fragmentary side view of the cooker looking in the direction of arrow 5, Fig. 4. Fig. 6 is a similar view looking in the direction of arrow 6, Fig. 4.

The same reference characters indicate the same parts in all the views.

Let the numeral 5 designate the body of the cooker which is exteriorly lined with metal as shown at 6 and provided with an interior metal lining 7. Interposed between these two linings is a filling 8 preferably composed of crushed or ground mica, which, as heretofore stated, is not only an electrical insulator but also serves to retard heat conduction and radiation.

The cooker is provided with a cover 9 hinged at 10 and adapted to tightly close the upper extremity of the chamber or oven 12. This cover is provided with a sort of catch 13 adapted to be engaged by a cam lever 14 pivoted at 15 and having a handle 16 for convenience of manipulation. By turning this cam lever to the position shown in Fig. 6, the cover is held tightly in the closed position, whereby the chamber or oven 12 is practically sealed hermetically.

The cover, like the other walls of the cooker, is provided with an outer metal plate 17 and an inner metal lining 18, the space between being preferably filled with ground mica 19 or other suitable packing material which is preferably a nonconductor of the electrical current and also a substance adapted to retard heat radiation and conduction. Through this cover is formed an opening 20 provided with a metal sleeve or lining 21 to the top of which is screwed an apertured plug 22. Into the bottom of the sleeve 21 is inserted a seat 23 for a ball valve 24, the said seat having a perforation 25 to permit the escape of steam or vapor when the pressure rises sufficiently for the purpose. Between the ball valve 24 and the screw-plug 22 is a coil-spring 26 which acts on the said valve with sufficient tension to maintain the same in the seated position. The plug 22 may be adjusted to regulate the tension of the spring 26, the said plug being apertured to permit the escape of vapor when for any reason the pressure within the oven or chamber approaches or attains any desired predetermined limit.

In the bottom of the cooker is formed a metal-lined recess or pocket 27 in which is located one or more coils 28 mounted upon a core 29. The top of this recess is closed by the bottom portion 30 of the metal lining 7 of the oven. I prefer to employ a plurality of cores 29 wound with wire, the number of coils mounted on distinct cores depending upon the required heating capacity. The terminals of the coils 28 are connected by means of conductors 31 with electrodes 32 having perforations 33 to receive coöperating detachable electrodes 34 carried by an insulating block 35 through which the electrodes 34 pass, being connected with wires 36 by nuts 37.

Supported in the upper part of the oven or chamber 12 is a disk or plate 38, preferably composed of fire clay and having a metal-lined recess 39 in which a plurality of coils 40 are located, the said coils being wound upon cores 41, the terminals 42 of the coils leading to hollow contacts 43 normally engaged by spring-actuated plugs 44 which are located in recesses or perforations 45 adapted to receive the members 34 of the electrode 35, the said perforations 45 being formed in exteriorly protruding electrodes 50. When the parts 34 of the electrode are inserted in the perforations 45, the circuit will be closed through the coils 40 and the disk 38 will be heated.

From an inspection of the drawing (see Fig. 5), it will be understood that when the electrode 35 is inserted in the perforations 45, whereby the contact members 34 are brought into electrical connection or contact with the spring-actuated electrodes 43, the circuit will be closed through the coils 41 of the fire clay disk 38; while when the electrode 35 is applied to the coöperating electrodes 32, the circuit will be closed through the coils 28 in the bottom of the cooker. Again, when the detachable electrode 35 is applied to an intermediate pair of electrodes 46, the electrical circuit will be simultaneously closed through both sets of coils, namely, the coils 28 and the coils 40. This will be understood from an inspection of Fig. 5.

Assuming that the electrode 35 is inserted in the perforations 45 of the electrodes 50, the current may be said to pass from one pole of the source, not shown, through one of the wires 36, to the coils 40 of the disk 38, and thence back through the other wire 43 to the other conductor 36, and thence through the same to the opposite pole of the source. In this event it will be observed that the current passes only through the coils of the disk 38 and in this event the disk alone will be heated. Now if it is desired to pass the current through the coils 28 only, the electrode 35 will be connected with the electrodes 32, in which event a current will pass from one pole of the battery or electrical source through one of the wires or conductors 36, thence to one electrode 32, and thence through a conductor 7 to the coils 28, and thence back through the other wire 7 to the other electrode 32, and thence through the other wire 36, connected with the electrode 35, to the other pole of the source, completing the circuit. Now if it is desired to pass the current simultaneously through both sets of coils, namely, the coils 28 in the bottom of the cooker and the coils 40 in the disk 38, the contacts 34 of the electrode 35 are inserted in the perforations 51 of the electrodes 46, in which event the current will pass from one pole of the source through one of the wires 36 to one electrode 46, and thence through a conductor 52 to a conductor 43, thence to and through the coils 40, thence back through the other conductor 43, and thence through a wire 54 and one wire 31, to the coils 28, and thence back through the other wire 31 to a point 55, and thence through a wire 56 to the other electrode 46 and thence through the other wire 36 to the opposite pole of the battery or electrical source, completing the circuit.

The disk 38 is supported on legs or standards 57 connected by a ring 58. The lower extremities of the standards 57 are bent to form feet 58^A which engage the bottom of the cooker, while their upper extremities are bent, as shown at 59 to form a rest for the disk.

In the event that it should be desired to set cooking utensils into the chamber 12, the disk 38, together with its supporting structure may be removed from the chamber or oven and employed independently, (see Fig. 2). In this event the disk 38 may be heated outside of the oven or chamber 12 for the purpose of cooking. In this event the contacts 34 of the removable electrode 35 are inserted in the sleeves 43 of the disk, thus closing the circuit through the coils 40 and heating the disk whose upper surface will in that event correspond with the top of the stove and articles of any character may be cooked thereon.

A recess 64 is formed in the top of the disk 38, underneath the metal lining. The metal lining is provided with an opening 65, slightly smaller than the recess and registering therewith. A tool may be inserted into this recess 64 through the opening 65 for removing the disk from the cooker.

In one side of the wall of the cooker is formed a peep-hole 60 covered by a transparent disk 61. Beyond the disk 61 is a small chamber 62 in which is located a thermometer 63, whereby the temperature of the oven or chamber 12 of the cooker may be readily observed.

Having thus described my invention, what I claim is:

1. An electric cooker, having a relatively thick wall constructed to prevent the escape of heat by radiation or conduction, a removable disk mounted within the cooker, and having a recess, heating coils located within the recess, contact sockets located in the disk and connected with the coils, spring-actuated electrode plugs located in the wall of the cooker and adapted to come into contact with the sockets of the disk when the said disk is in position, and a portable electrode adapted to be connected in operative relation with the spring-actuated electrodes.

2. An electric cooker comprising a disk having a recess therein, heating coils located within the recess, contact sockets located in the disk and connected with the coils, a portable electrode adapted to be inserted in the said contact sockets and connected in operative relation with the coils, and supporting legs upon which the disk is mounted, substantially as described.

In testimony whereof I affix my signature in presence of two witnesses.

WILL NICHOLS.

Witnesses:
  A. J. O'BRIEN,
  A. EBERT O'BRIEN.